United States Patent [19]
Steinebronn et al.

[11] 3,980,910
[45] Sept. 14, 1976

[54] PHASE LEAD CONNECTOR

[75] Inventors: Kurt H. Steinebronn, North Huntingdon; Frank P. Fidei, Pittsburgh, both of Pa.

[73] Assignee: Westinghouse Electric Corporation, Pittsburgh, Pa.

[22] Filed: Dec. 16, 1974

[21] Appl. No.: 533,406

[52] U.S. Cl. .................................. 310/71; 310/260
[51] Int. Cl.² ...................................... H02K 11/00
[58] Field of Search ............ 310/71, 162, 163, 165, 310/194, 260, 270, 271, 272, 273; 336/192, 107; 339/265, 266 G; 322/25

[56] References Cited
UNITED STATES PATENTS

| | | | |
|---|---|---|---|
| 2,994,735 | 8/1961 | Marshall | 310/260 |
| 3,502,917 | 3/1970 | Bizoe | 310/71 |
| 3,648,091 | 3/1972 | Kostin | 310/260 |
| 3,665,234 | 5/1972 | Bishop | 310/260 |
| 3,691,416 | 9/1972 | Drexler | 310/260 |
| 3,702,965 | 11/1972 | Drexler | 310/162 |

FOREIGN PATENTS OR APPLICATIONS

| | | | |
|---|---|---|---|
| 170,534 | 8/1951 | Austria | 310/260 |
| 1,127,916 | 9/1968 | United Kingdom | 310/260 |

*Primary Examiner*—R. Skudy
*Attorney, Agent, or Firm*—D. T. Griggs

[57] ABSTRACT

A connector assembly for joining gas-cooled phase leads of a dynamoelectric machine. First and second L-shaped plates connect each split end portion of a stator coil to a stator phase lead by means of screw bolts which join a shoulder portion of each plate with a crown portion of each plate. The opening defined by the interlocked crown and shoulder portions is adjustable to an exact fit with the conductor strands disposed therein by means of a slot in each shoulder portion which allows variable alignment with a tapped hole in the crown portion of each plate. After the screw bolts are tightened to a predetermined contact pressure, the conductor strands are soldered one to another and to the first and second connector plates.

7 Claims, 7 Drawing Figures

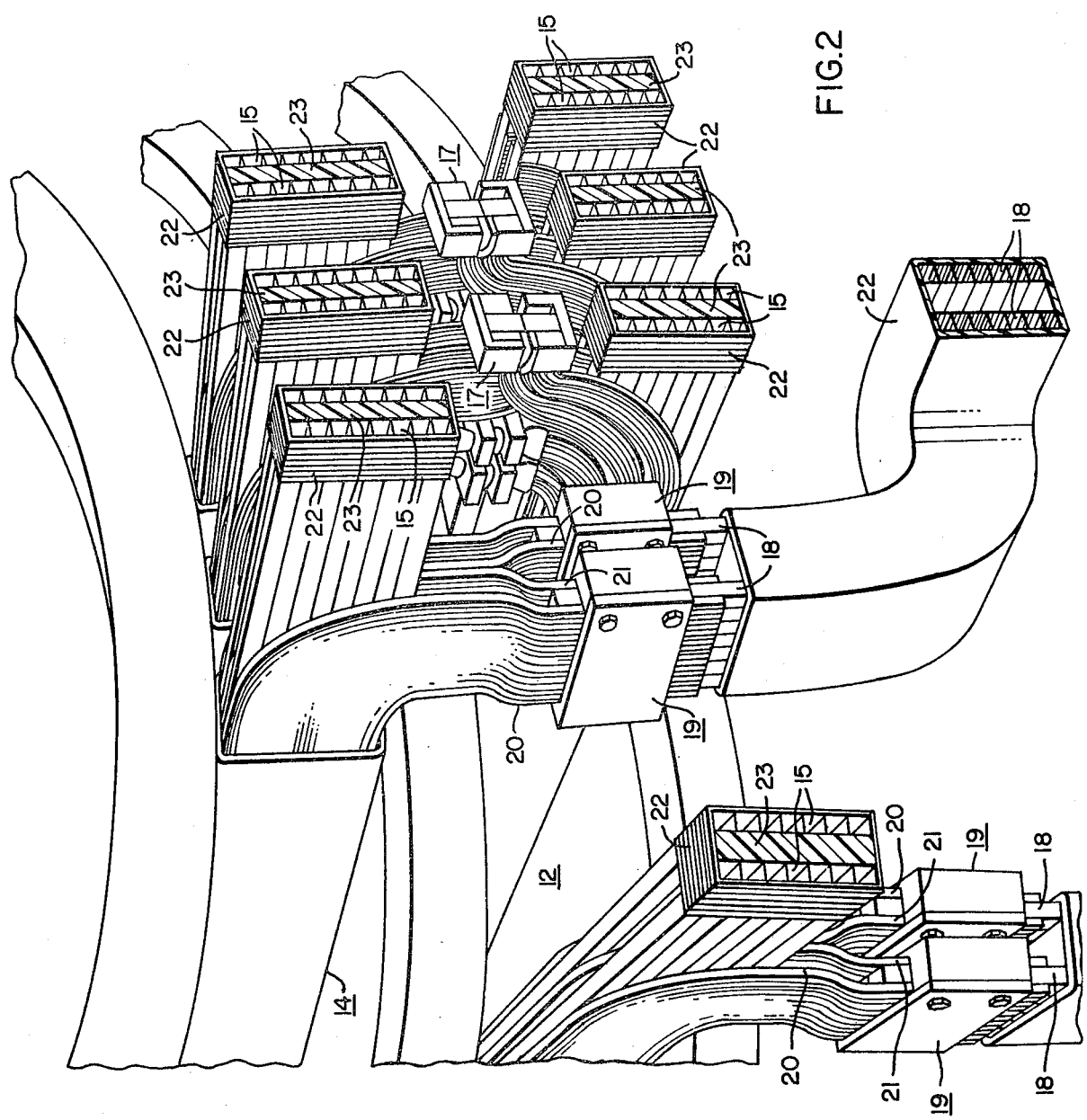

PHASE LEAD CONNECTOR

BACKGROUND OF THE INVENTION

1. Field of the Invention

This invention relates to gas-cooled windings of dynamoelectric machines, and more particularly, to means for electrically and mechanically connecting stator phase leads to the phase coils of such windings.

2. Description of the Prior Art

In large inner-cooled turbine generators which utilize a gas such as hydrogen as the cooling medium, the stator winding is usually split to facilitate heat transfer with an inner-cooling duct heat exchanging system. A split conductor arrangement is constructed by joining a large phase lead with two smaller conductors in an overlapping arrangement. The phase lead and conductors are composed of multiple conductor strands which are arranged in columns, and the combined cross-sectional area of the smaller conductor strands comprising the split winding is equal to the cross-sectional area of the larger conductor strands which comprise the phase lead. The smaller conductors, which are joined with the larger conductor in the end turn region of the stator, are extended in a parallel arrangement with the inner-cooling ducts through axial stator slots. The coolant is circulated through the cooling ducts in direct thermal contact with the current carrying split phase leads. The split conductor cooling arrangement has made it possible to greatly increase the maximum capacities in large generators without exceeding the permissible limits of physical size.

In this type of construction high mechanical strength and good electrical conduction is required for the union of the split phase lead conductor portions. Good electrical conduction and mechanical strength are interrelated fundamentally upon two factors: contact area and contact pressure. The effective contact area relative to the cross-sectional area of the conductor is of great importance since it controls the resistance of the connection. It must remain uniform in size and not be affected by temperature changes or vibration. The contact pressure must be high enough so that adjacent conductor surfaces are pressed together with essentially all particles of the contact area being interlocked and free from insulating impurities. In general, the contact force should be great enough to produce a contact area which is equal to or greater than 1.5 times the cross-sectional area of the conductor. If the force holding the conductors together is too small, only the high points of the surface is touched and large currents passing through such a connection may develop heat and melt the metal at the high spots.

Proper contact pressure and contact area have been provided by a variety of prior art devices. Commonly used phase lead connectors include the pressure clamp illustrated in FIG. 7 of the drawing. This clamp, formed of copper, is rolled to obtain the dimensions necessary to enclose the conductors. The rolled clamp provides only an approximate fit, however, and gaps remain after the pressure clamp is positioned around the stranded conductor union. Since these gaps must be closed during soldering to insure proper contact area and contact pressure, a large compressive force is applied to the clamp and the clamp is crimped around the overlapping conductors.

Coil strands have been severely deformed and broken as a result of this crimping procedure. Also, considerable difficulty has been encountered in maintaining the required contact area and pressure throughout the expected life of the clamp connector. Furthermore, unbonding of the soldered connection has been found to occur during operation of the turbine generator at high stator load currents. This unbonding is caused by various mechanical disturbances such as vibration and temperature changes. Large mechanical forces are induced by changes in high flux concentration surrounding these phase leads in the end turn regions. Also, when the soldered connection is subjected to high temperatures which accompany a large current flow, the contact pressure at the union of the conductors is relaxed.

These problems stem directly from the lack of precision in the fitting of the pressure clamp about the conductor strands and in the lack of means for applying and maintaining uniform pressure across the overlapped conductor strands. It is, therefore, a principal object for the present invention to provide a connector having a conductor receiving region which may be accurately adjusted to provide a closely conforming fit and which also includes means for maintaining controlled, uniform contact pressure of sufficient magnitude to insure good electrical conductivity as well as mechanical strength.

SUMMARY OF THE INVENTION

The present invention comprises a connector assembly consisting of two interlocked plates which are soldered together after having been attached to the end turn portions of the split stator coil lead and stator phase lead. All mating surfaces of the interlocking plates are smooth and flat to provide a tight, conforming fit with the overlapping conductor strands. The interlocking plates are L-shaped, each having a shoulder portion and a crown portion. Tightening means, including screw bolts, join the shoulder and crown portions in a tight compressive union. The interlocked shoulder and crown portion define a rectangular opening for receiving and confining the stranded conductors.

The minimum vertical clearance of the rectangular opening is established by the dimensions of the crown portion and is arbitrarily less than the combined height of the overlapping conductor strands so that a compressive load may be directed upon the conductors when the shoulder and crown portions are drawn together by the connecting means. The opening defined by the interlocked crown and shoulder portions is adjustable laterally to provide an exact fit with the conductor strands disposed therein by means of a slot in the shoulder portion which allows variable lateral alignment with a matching tapped hole in the crown portion of each plate. The connector may, therefore, be accurately adjusted to provide a closely conforming fit with the enclosed conductor strands so that gaps do not occur and maximum contact area is obtained. The tightening means maintain a controlled, uniform contact pressure thereby assuring good electrical conduction and high mechanical strength throughout the expected life of the connector.

BRIEF DESCRIPTION OF THE DRAWINGS

The invention will be more fully understood from the following detailed description of a preferred embodiment, taken in connection with the accompanying drawings, in which:

FIG. 2 is a partial isometric view of the turbine generator of FIG. 1 which illustrates the connection of a split phase lead;

DESCRIPTION OF THE PREFERRED EMBODIMENT

The present invention is concerned primarily with connecting means for the winding of dynamoelectric machines. Accordingly, in the description which follows the invention is shown embodied in a large gas-cooled turbine generator. It should be understood, however, that the invention may be utilized as a conductor connecting means in any dynamoelectric machine.

Figure 1:
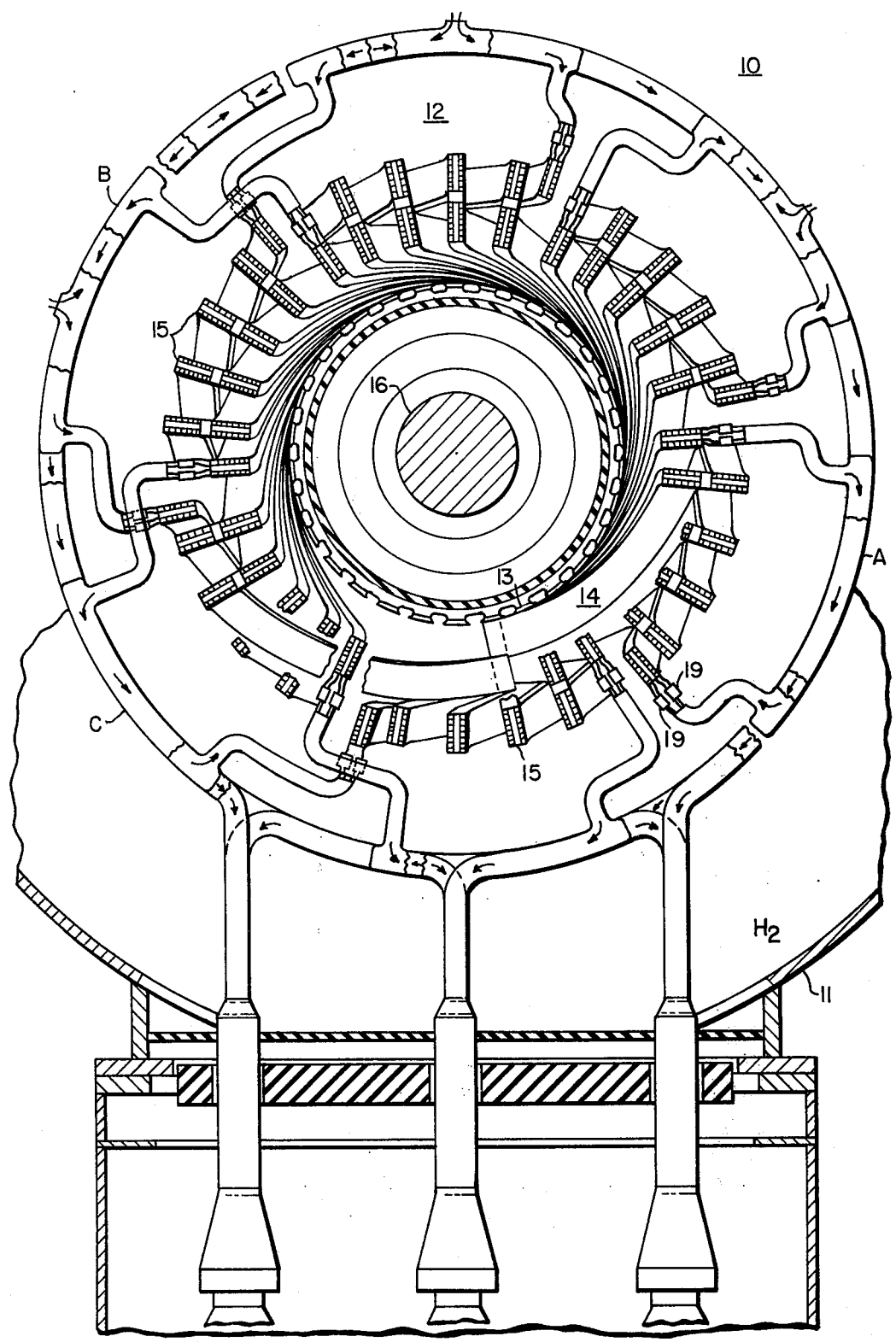
FIG. 1 is a transverse sectional end view of an exemplary turbine generator embodying the invention.

In FIG. 1 the invention is shown, by way of illustration, disposed in operating position within a large turbine generator 10. The generator 10 may be a two or four pole three-phase machine of almost any rating, but for purposes of the present description it may be considered to be a two pole 60 Hz three-phase generator having a rating in excess of 175,000 kilowatts. The generator 10 may take any form of usual gas ventilating construction which embodies the same or similar features.

As shown in FIG. 1, the generator 10 has an outer substantially gas tight closing housing 11 which is filled with a coolant gas which is normally hydrogen. The generator 10 has a laminated stator core 12 of usual construction which is supported within the housing 11 in any suitable manner. The stator core 12 is provided with longitudinal slots 13 in the usual manner for the reception of the high voltage stator winding coils 14. The winding 14 is of the inner cooled type and is provided with internal ventilating ducts 15 which are open at the ends of the coils to permit the hydrogen to flow through the ducts. The generator 10 also has a rotor member 16 of any suitable type which is provided with a field winding (not shown) preferably also of the inner-cooled type. As shown, the coolant gas enters the rotor 16 at both ends and is discharged through radial vents (not shown) at the center of the rotor 16. The coolant gas may be circulated through the machine in any suitable manner. In this system the gas is circulated by a blower (not shown) on the rotor shaft which circulates the coolant gas in a manner generally shown by arrows in FIG. 1. It is to be understood that this particular ventilating system is shown only by way of illustration to illustrate the type of machines to which the present invention is applicable, and that any suitable or desired construction in the ventilating system might be used.

The stator winding 14 of a machine of this type consists of a suitable number of half coils or coil sides, two half coils in place in each of the slots 13 and the half coils being connected at the ends to form the complete winding. The winding 14 is connected for three-phase operation, each phase consisting of two-phase zones which are connected by the parallel phase connecting leads A, B, and C, respectively. It will be understood that all of the half coils except those which constitute the terminal portions of the six-phase zones are connected in series with each other, at their ends, at both the front and back ends of the machine by means of winding-apex series connectors 17 between the appropriate top and bottom coil sides. Individual phase leads 18 extend radially from the parallel phase connecting leads A, B, and C are joined by means of a bolted phase lead connector 19 with a beginning half coil portion 20 and a terminal half coil portion 21 in each phase coil to complete the winding connection.

In a preferred form of construction of the stator conductors from which the stator winding is made, each conductor consists of two stacks of strands, which are displaced circumferentially by a stack of cooling duct means 15, so that the strands are disposed on both sides of the duct 15, with the duct 15 in the middle of the stranded conductor. This description is particularly applicable to the straight coil side portions which lie within the conductor receiving slots of the stator core, but the duct ends preferably extend on through to the diamond ends or coil apex portions as shown in FIGS. 1 and 2. The two halves of each stator coil are shown as having their coil side portions lined in circumferentially spaced slots and having their coil apex portions adjacent to each other at an intermediate point between the circumferentially spaced coil side portions at each end of the coil, being conventional turbogenerator armature construction in this respect.

In FIG. 2 there are shown end portions of two half coils which are connected together. It will be understood, of course, that one of these coil sides will be in the bottom of one slot of the stator core and the other will be in the top of a different slot. At the end of each half coil the ground insulation terminates and the open ends of the ventilating ducts 15 extend out from the end of the coil 14 for entrance or discharge of hydrogen. The conductor strands are usually brought out in separately insulated groups to permit group transpositions to be made between adjacent coils. The groups of conductor strands are formed in the general shape indicated in FIG. 2 and are connected to groups of strands of the adjacent half coil by connectors 17 of any suitable type.

In accordance with the invention, all of the end connections are of the ventilated conductor, or inner-cooled type, in which suitable ventilating ducts 15 are provided in good heat exchanging relation to respective conductors of these connections. Note that an inner-cooling arrangement is illustrated for these end connections. Portions of these end connections may be in the form as shown in FIGS. 1 and 2 for the phase lead assembly consisting of the stack of phase lead conductor strands 18 disposed between the two stacks of strands comprising the half coil portions 20, 21. Any form of inner-cooling construction, or any equivalent device for assembling, may be used with the inner-cooled conductors according to the construction which is found to be most practicable.

In the particular embodiment shown the strands of each conductor are disposed in vertical stacks although other suitable arrangements of strands might be used. The strands are insulated from each other and are transposed in any suitable manner. Since the strands of each phase coil are shorted together at each end by the phase lead connector means 19, as described more fully hereinafter, a type of transposition should be utilized which makes it possible to connect the strands together at the ends without incurring excessive losses. Each winding conductor is, of course, enclosed in the usual heavy ground insulation, which has not been illustrated in the drawing, and which is removed from the extreme ends of each conductor to permit application of the conducting means. In accordance with the usual practice two winding conductors are placed in each slot of the stator core, and the end portions of each conductor beyond the slot are formed in the usual manner to extend around the core for connection with a series connector 17 to the end of another winding conductor lying in a different slot to form a complete coil.

As previously explained, it is necessary to secure the connectors to the ends of the winding 14 with mechanically tight connections. This means that there must be a high pressure union between the connector itself and the strands which are immediately adjoined and also between the stacks of strands and the individual strands of each stack. This is necessary to minimize the resistance of the joint and to prevent unbonding of individual strands. The present invention provides a construction which makes it possible to make reliable mechanically tight phase lead joints between the connector and the strands in a relatively simple manner.

Figure 5:
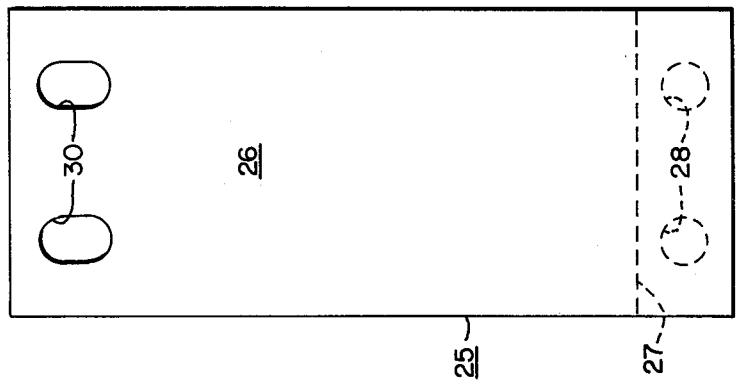
FIG. 5 is an elevation view of an L-shaped connector plate.
Figure 4:
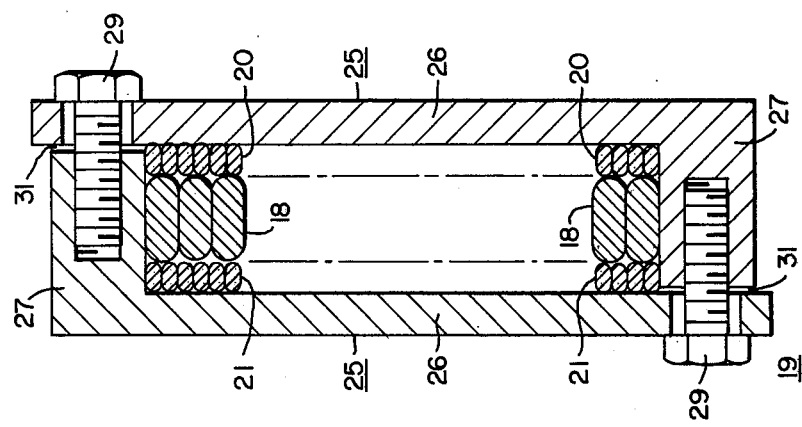
FIG. 4 is a sectional view of a split phase lead connection utilizing the present invention, the view being taken from the line IV—IV of FIG. 3.
Figure 6:
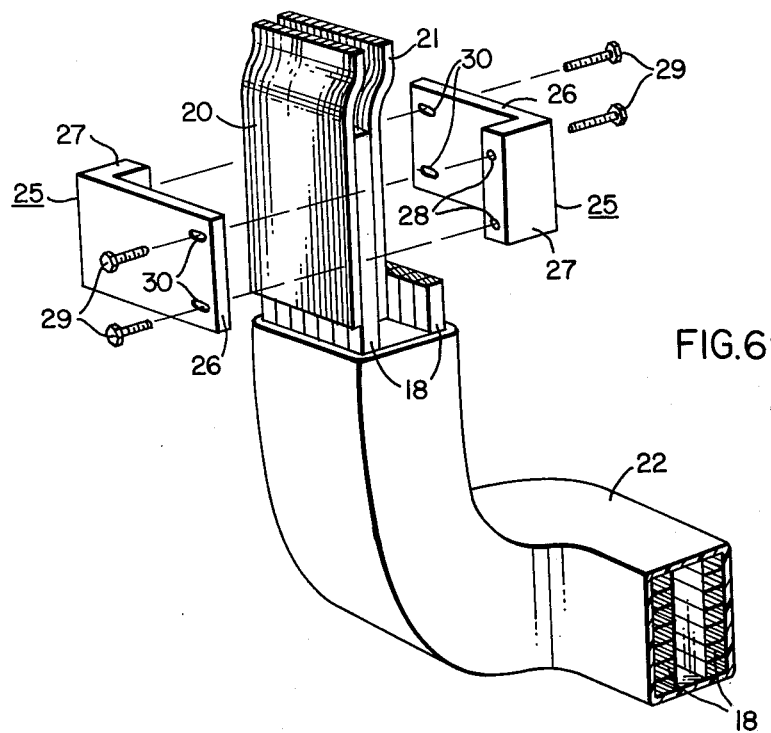
FIG. 6 is an exploded view of a phase lead connector assembly utilizing the present invention in association with split phase leads.

In a preferred embodiment of the present invention, a phase lead connector 19 comprises first and second L-shaped plates 25 which are illustrated in FIGS. 4, 5 and 6. Each plate 25 consists of a flat shoulder portion 26 which is generally rectangular in cross-section and which may have any desired dimensions, provided however, that it will accommodate the combined stranded conductors. From one end of each plate 25 a crown portion 27 extends at right angles to the shoulder portion 26. The crown portion 27 is also rectangular in cross-section and may also have any desired dimensions which will accommodate the combined stranded conductors. The crown portion 27 is preferably integrally formed with the shoulder portion 26; however, it may be joined therewith by any suitable means. The plates 25 are preferably fabricated from a highly conductive, non-magnetic metal such as copper. A non-magnetic metal is preferred in order to reduce heating caused by high flux concentrations.

As shown in FIG. 4, each crown portion 27 has a pair of threaded recesses 28 for receiving a threaded end of a screw bolt 29. Each shoulder portion 26 has two spaced slots 30 which are adapted to receive and pass the screw bolts 29 to the threaded recesses 28. The threaded recesses 28 are preferably reinforced by stainless steel heli-coil inserts (not shown) to prevent stripping of the relatively soft copper crown portion 27.

The L-shaped plates 25 are preferably identical in construction and are mutually symmetrical when the shoulder portion 26 of one plate is assembled with the crown portion 27 of the other plate. In this arrangement, the shoulder slots 30 are brought into concentric alignment with the threaded recesses 28. All mating surfaces of the interlocking plates 25 are smooth and flat to provide a tight conforming fit with the overlapping phase lead conductor strands.

The opening defined by the interlocking crown and shoulder portions is adjustable axially by means of the shoulder slots 30 which provide variable axial alignment with the matching threaded recesses 28 of the crown portions 27. The radial clearance of the rectangular opening is established by the dimensions of the crown portions 27. The maximum radial extension of the crown portion 27 of each plate 25 should be arbitrarily less than the combined thickness of the overlapping conductor strands so that a compressive load may be directed upon the conductors when the shoulder portions 26 and crown portions 27 are drawn together. In the illustration of FIG. 4, the crown portion 27 is slightly smaller than the combined conductors so that a gap 31 of approximately 1/32 of an inch is established between the crown 27 and the shoulder 26 portions. The screw bolts 29 form a compressive union with the interlocked plates 25 and conductors and are torqued equally to provide a uniform pressure distribution across the conductor-connector interface. A torque of 10 to 15 foot pounds is the preferred range for the embodiment of FIG. 4. The screw bolts 29 are preferably constructed from a high strength non-magnetic material such as stainless steel to reduce the heating caused by high flux concentrations.

Figure 3:
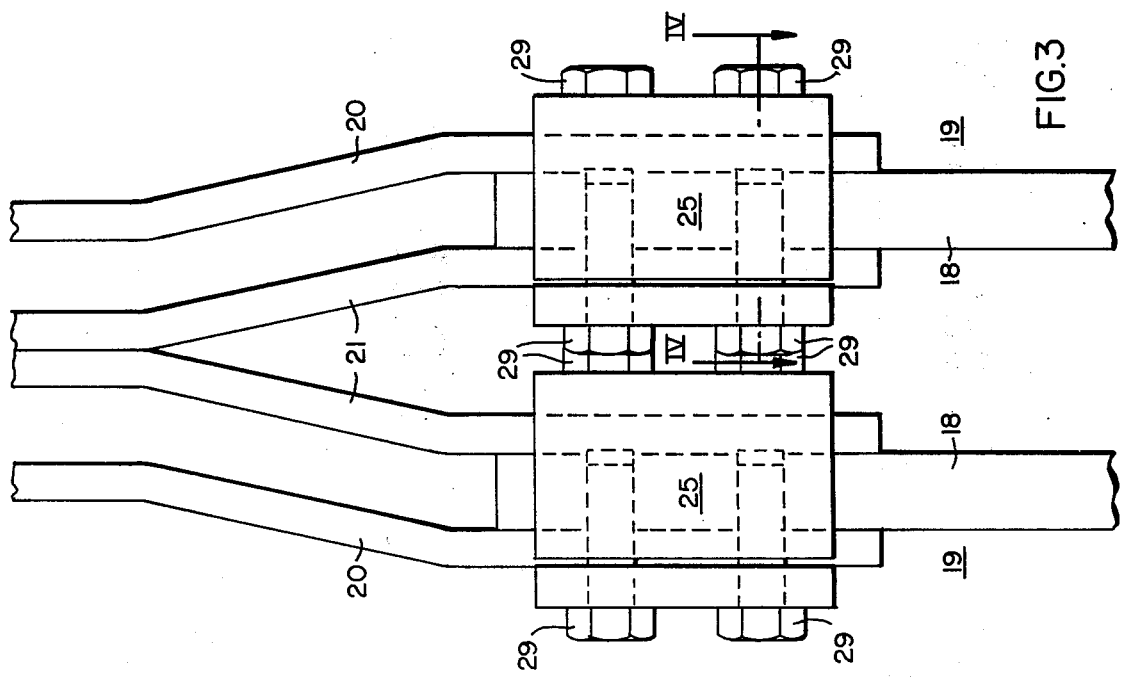
FIG. 3 is an elevation view of the phase lead connector of FIG. 2.

As shown in FIGS. 2 and 3, the two plates 25 comprising the phase lead connector are assembled with the crown portions 27 and shoulder portions 26 of opposite plates disposed about a split lead assembly 19. In this assembly, a single phase lead 18 is sandwiched within the two smaller half coil portions 20, 21 in an overlapping arrangement. The plates 25 are held together to form a tight union with the overlapping conductors so that maximum contact area is established between the flat portions of the plates 25 and the conductor strands. The screw bolts 29 are tightened so that the pressure distribution across the shoulder portions 26 is uniform. The conductor-connector union is then heated, preferably by induction means, to approximately 380°F – 460°F. The assembly 20 may be drilled for insertion of thermocouple means (not shown) to measure the internal temperature of the union. After the proper temperature is achieved, ribbon solder is applied to the union. Although any solder compostion may be used, a 70Pb - 30Sn solder is preferred since it remains in a partially molten state over a wider temperature range, and thus can be uniformly distributed between the conductor strands. Prior to the soldering operations the conductor strands and connector surfaces are cleaned and tinned in the usual manner.

In FIGS. 3 and 4 it will be noted that the screw bolt head portions are conveniently located so that they serve as spacing elements to separate adjacent connector assemblies. The screw bolt heads prevent buckling of the connectors when strong forces are directed around the conductors in the end turn regions due to transient flux conditions. Thus additional spacing elements are eliminated and assembly may be accomplished more easily and rapidly.

Figure 7:
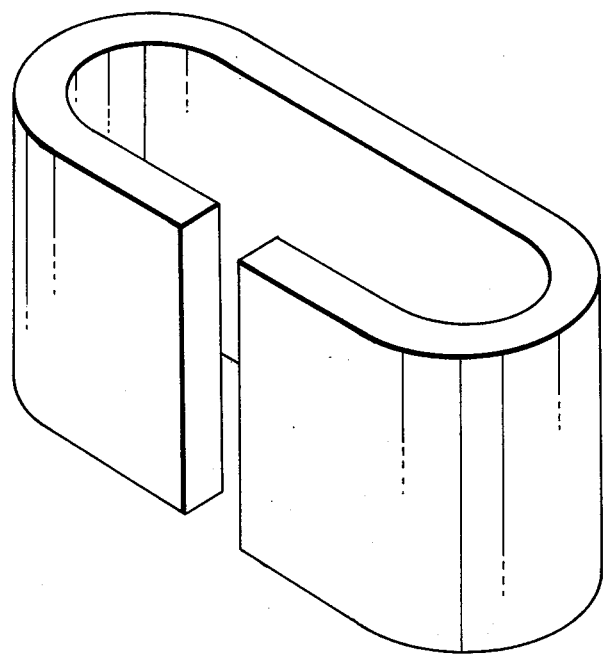
FIG. 7 is an isometric view of a prior art connector clamp.

A further advantage offered by the integral spacer arrangement is that of convenience during ultrasonic testing. After the conductors are joined in the soldered connector assembly, the connection is tested by ultrasonic means to detect discontinuities caused, for example, by insufficient interior temperature during soldering, or improperly fitted conductor portions. A through transmission type ultrasonic transducer is attached in the critical test area located on the outside surface of the shoulder portion 26 of each plate 25. This critical test area is not available when conventional spacer blocks are used with conventional connector devices such as the connector clamp of FIG. 7, since the spacer blocks cover most of the interior test area. Furthermore, conventional spacer blocks are usually attached to adjacent connector assemblies by brazing. The brazing process is time consuming and tends to weaken the copper connectors because of the associated annealing effect.

Another important feature of the present invention is the separate L-shaped configuration of the phase lead connector plates 25 which makes it possible to first assemble the coil strands of the phase lead 18 and of the half coil portions 20, 21 in a properly aligned position and then place the two halves of the connector 19 around the strands without disturbing the strand fit-up. This is especially important in the case where distance between the coil end and the phase lead is very short.

It will now be apparent that an improved phase lead connector has been provided which establishes a highly conductive and mechanically tight connection for stator winding conductors. The construction of the connector is such that a reliable soldered joint is readily produced to join a plurality of conductors in a mechanically tight joint which prevents any unbonding between the conductors and the connector and between the individual strands of the conductor. This construction results in a mechanically stable connector which is adequately supported to substantially prevent the failures which could occur because of vibration and temperature fatigue, the conductor strands and connector plates being solidly bonded together in a manner to prevent individual vibrations of a strand or a group of strands. The possibility of buckling failures caused by mechanical forces exerted upon the connector assemblies is also prevented by the integral screw bolt heads which serve as spacing elements.

Certain preferred materials have been described for the purpose of illustration but it will be understood that other suitable materials could be used if desired. While the invention has been illustrated by only one embodiment, it should be understood that in the broadest aspects of the invention certain changes may be made by the omission of unwanted parts, by the addition of parts, or in the substitution of equivalents without departing from the broadest aspects of the invention.

What is claimed is:

1. In a dynamoelectric machine having a magnetic core member and a winding disposed in slots upon said core member, said winding including a plurality of conductors arranged in spaced apart relation on said core member and having end portions disposed adjacent to each other for connection to a phase lead, the combination with said winding of an improved connector for providing mechanical and electrical connection between selected ones of said conductor end portions and one or more of said phase leads, said combination comprising:
 a first L-shaped plate having a shoulder portion and a crown portion extending at a right angle from said shoulder portion;
 a second L-shaped plate having a shoulder portion and a crown portion extending at a right angle from said shoulder portion;
 means joining said first plate with said second plate, the crown portion of said first plate being joined with but not engaging the shoulder portion of said second plate and the crown portion of said second plate being joined with but not engaging the shoulder portion of said first plate whereby a gap is defined between the confronting surfaces of said crown and shoulder portions, the assembled crown and shoulder portions of said first and second plates defining a rectangular opening for receiving and confining preselected ones of said conductors and phase leads;
 said conductors and phase leads being arranged in an overlapping relationship within said opening and being engaged by said crown and shoulder portions, the width of said opening being arbitrarily less than the combined width of said overlapping conductors and phase leads so that a compressive load is directed upon said conductors and phase leads in a direction normal to the inner surface of said shoulder portions and parallel with the inner surface of said crown portions by said first and second plates as said shoulder and crown portions are drawn together by said plate connecting means.

2. The combination as defined in claim 1, said dynamoelectric machine including a stator member, a plurality of coils constituting a stator winding disposed upon said stator member, each of said coils comprising two conductors spaced apart on said stator member and having end portions disposed adjacent to each other for connection to a phase lead, said connector being joined in mechanical union with said coil end portions and said phase lead.

3. In a dynamoelectric machine having a magnetic core member and a winding disposed in slots upon said core member, said winding including a plurality of conductors arranged in spaced apart relation on said core member and having end portions disposed adjacent to each other for connection to a phase lead, the combination with said winding of an improved connector for providing mechanical and electrical connection between selected ones of said conductor end portions and one or more of said phase leads, said combination comprising:
 a first L-shaped plate having a shoulder portion and a crown portion extending at a right angle from said shoulder portion;
 a second L-shaped plate having a shoulder portion and a crown portion extending at a right angle from said shoulder portion;
 means joining said first plate with said second plate, the crown portion of said first plate being joined with but not engaging the shoulder portion of said second plate and the crown portion of said second plate being joined with but not engaging the shoulder portion of said first plate whereby a gap is defined between the confronting surfaces of said crown and shoulder portions, the assembled crown and shoulder portions of said first and second plates defining a rectangular opening for receiving and confining preselected ones of said conductors and phase leads;
 said conductors and phase leads being arranged in an overlapping relationship within said opening and being engaged by said crown and shoulder portions, the width of said opening being arbitrarily less than the combined width of said overlapping conductors and phase leads so that a compressive load is directed upon said conductors and phase leads in a direction normal to the inner surface of said shoulder portions and parallel with the inner surface of said crown portions by said first and second plates as said shoulder and crown portions are drawn together by said plate connecting means; said shoulder portion of each plate having at least one slot extending therethrough and said crown portion of each plate having at least one opening, said plate connecting means including a plurality of screw bolts, at least one of said screw bolts connecting the crown portion of said first plate with the shoulder portion of said second plate, and at least one of said screw bolts connecting the crown portion of said second plate with the shoulder portion of said first plate, said screw bolts extending through said shoulder slots and being in engagement with said crown openings.

4. The combination as defined in claim 3 wherein two of said conductors are arranged in overlapping relationship with one of said phase leads disposed therebetween, said overlapping conductors and phase lead being confined by said shoulder and crown portions.

5. The combination as defined in claim 3 wherein said conductors and phase lead are soldered one to another and to said shoulder and crown portions of said connector.

6. The combination as defined in claim 3 wherein each of said conductors and phase leads comprises a group of stranded conductor portions, said stranded conductor portions of each group being arranged in a side-to-side stacked relationship with each other, said plate connecting means establishing a high pressure union between the plates of said connector and said strands which are immediately adjoined thereto and also between the stacks of strands and the individual strands of each stack.

7. The combination as defined in claim 3, said dynamoelectric machine including a stator member, a plurality of coils constituting a stator winding disposed upon said stator member, each of said coils comprising two conductors spaced apart on said stator member and having end portions disposed adjacent to each other for connection to a phase lead, said connector being joined in mechanical union with said coil end portions and said phase lead; and, a plurality of said connector assemblies being disposed adjacent to each other, said screw bolts extending from said shoulder portions to separate said connectors.

* * * * *